(12) United States Patent
Niebuhr et al.

(10) Patent No.: US 6,851,744 B2
(45) Date of Patent: Feb. 8, 2005

(54) ROOF MODULE FOR A MOTOR VEHICLE (75) Inventors: Frank Niebuhr, Gifhorn (DE);
Joachim Röder, Mühlheim (DE);
Markus Lutz, Gifhorn (DE); Manfred Röhnke, Rödermark (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/114,673

(22) Filed: Apr. 2, 2002

(65) Prior Publication Data
US 2002/0167201 A1 Nov. 14, 2002

(30) Foreign Application Priority Data
Apr. 3, 2001 (DE) .......................................... 101 16 456

(51) Int. Cl.[7] .................................................. B60J 7/00
(52) U.S. Cl. .............. 296/213; 296/216.01; 296/193.04
(58) Field of Search .......................... 296/193.04, 210, 296/211, 213, 216.01–216.02, 216.06, 216.07, 216.08, 197

(56) References Cited

U.S. PATENT DOCUMENTS

| 3,352,600 A | * | 11/1967 | Wilfert .................. 296/216.02 |
| 3,550,950 A | * | 12/1970 | Pollock ....................... 296/213 |
| 3,815,307 A | * | 6/1974 | Tantlinger .................. 52/285.1 |
| 4,049,309 A | * | 9/1977 | Seal |
| 4,289,349 A | | 9/1981 | Symeonidis |
| 4,417,762 A | * | 11/1983 | Imai et al. .................. 296/213 |
| 4,475,765 A | * | 10/1984 | Vogt et al. .................. 296/210 |
| 4,646,499 A | * | 3/1987 | Wilson ......................... 52/408 |
| 6,378,935 B2 | * | 4/2002 | Dryselius et al. ........... 296/213 |
| 6,409,258 B1 | * | 6/2002 | Grimm et al. ......... 296/216.08 |

FOREIGN PATENT DOCUMENTS

| DE | 3545871 A1 | 6/1987 | |
| DE | 4024837 C2 | 1/1994 | |
| DE | 43 44 604 C1 | 12/1994 | |
| DE | 44 44 539 A1 | 6/1996 | |
| DE | 19634854 C1 | 10/1997 | |
| DE | 198 10 839 A1 | 9/1999 | |
| EP | 0 447 640 A2 | 9/1991 | |
| EP | 0995667 | * 4/2000 | |
| EP | 0 995 667 A1 | 4/2000 | |
| EP | 1 132 240 A2 | 9/2001 | |
| GB | 925323 | * 5/1963 | ............ 296/216.02 |
| GB | 2184404 | * 6/1987 | ............ 296/216.01 |
| JP | 360206724 | * 10/1985 | ............ 296/216.06 |

OTHER PUBLICATIONS

Automotive Engineering International, Apr. 2000, p. 80.*
MGA Research Corporation, "Roof Crush Resistance FMVSS/CM 216" web site Jan. 31, 2004.*
Translation of EP0447640 A2, US Patent and Trademark Office, Jan. 2004.*
European Search Report dated Mar. 13, 2003.

* cited by examiner

*Primary Examiner*—Dennis H. Pedder
(74) *Attorney, Agent, or Firm*—Carlson, Gaskey & Olds (57) ABSTRACT A roof assembly for a motor vehicle comprises a rim portion that guides a roof module towards an opening for a sliding roof cover. The rim portion has a water groove formed integrally with the roof module. In addition, the roof module may have an integrally formed spoiler adjacent the water groove.

13 Claims, 7 Drawing Sheets

ROOF MODULE FOR A MOTOR VEHICLE

This application claims priority to German Patent Application DE 101 16 456.4 filed 3 Apr. 2001.

BACKGROUND OF THE INVENTION

This invention relates to a roof module for a motor vehicle. The roof module comprises a rim portion that guides the roof module towards an opening for a sliding roof cover, for example. The roof module may also be used for roof-supported sliding roofs or folding roofs.

In the prior art, the roof module drops into an interior of a vehicle when the sliding roof is open. At least one water groove is required at the rim of the opening to prevent water from leaking into the vehicle. Usually, this water groove is part of a guide of the sliding roof, and is mounted to the roof module as a separate assembly unit.

The object of the invention is to provide a roof module that can be produced at a lower cost.

SUMMARY OF THE INVENTION

The inventive roof module comprises a rim portion that guides the roof module towards an opening for a sliding roof cover. The rim portion has at least one water groove formed in one piece with the roof module. Because the water groove is an integral part of the roof module now, fewer components are required. Moreover, the inventive design reduces tooling and piece costs.

In one variation of the invention, the roof module has an outer skin that extends continuously to form the water groove. The roof module may have a deep-drawn outer skin made of metal, or a shaped outer skin made of synthetic material with the water groove formed as part of the roof module in one piece, resulting in particularly low production costs.

In another variation of the invention, the roof module has an integrally formed spoiler that adjoins the water groove. For a multitude of sliding roofs, the spoiler reduces wind noise and improves air flow conditions with the sliding roof open. Because the spoiler is now formed in one piece with the roof module, there results a further reduction in the number of parts required for the roof module.

Further designs of the invention will be apparent from the disclosure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
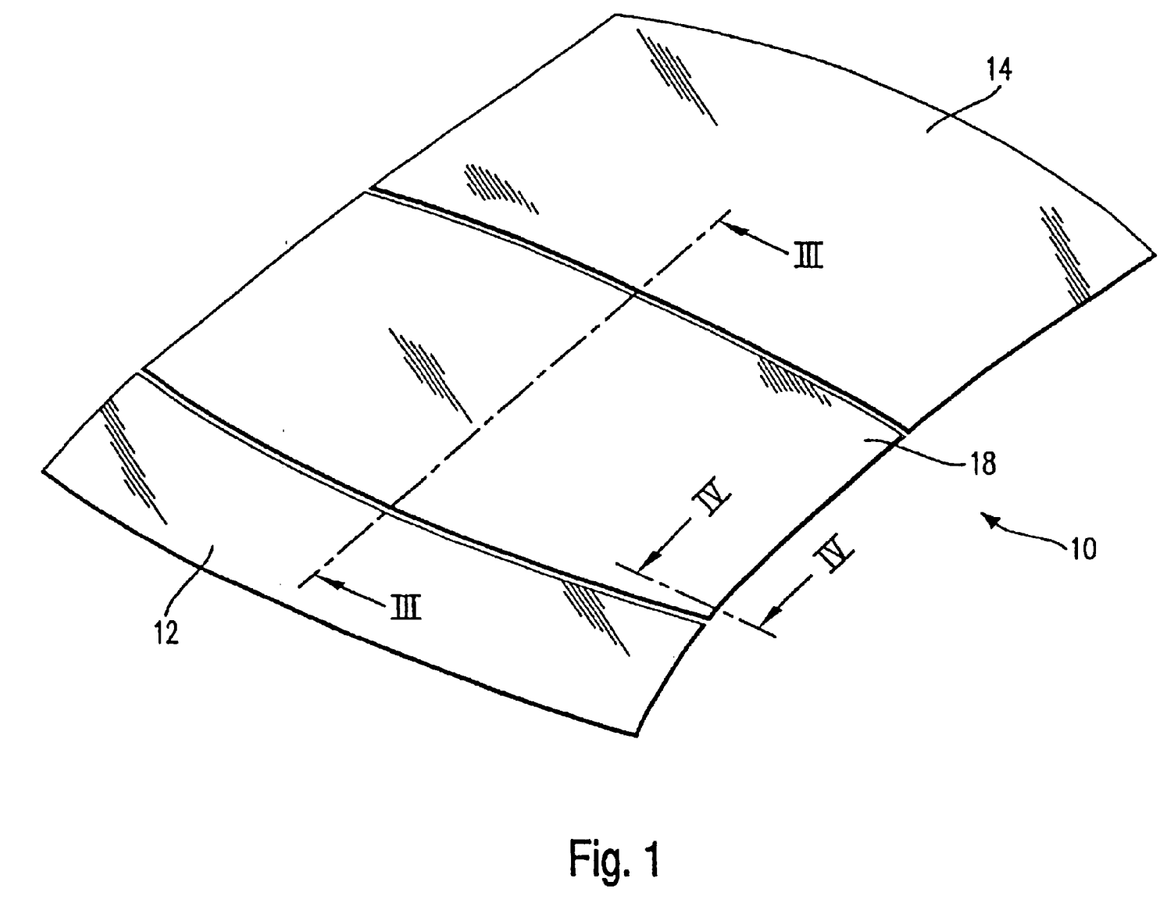
FIG. 1 is a schematic, perspective top view of a roof module according to a first variation, with an attached sliding roof cover.

As shown schematically in FIG. 1 roof module 10 for a motor vehicle has a front module part 12, a rear module part 14, two struts 16 (see FIG. 2) extending between the front and rear module parts, and a sliding roof cover 18. Cover 18 serves to close or expose an opening 28 formed between the front module part 12 and the rear module part 14. In the position shown in FIG. 1, the opening is closed. To expose the opening, cover 18 may be moved to the rear so that it lies on the rear module part 14. Although there is described by way of example a sliding roof having a cover, the invention may also be implemented in roof-supported sliding roofs, or folding roofs. The term "roof-supported sliding roof" designates a sliding roof which, when opened, rests atop the automobile's roof.

Figure 3:
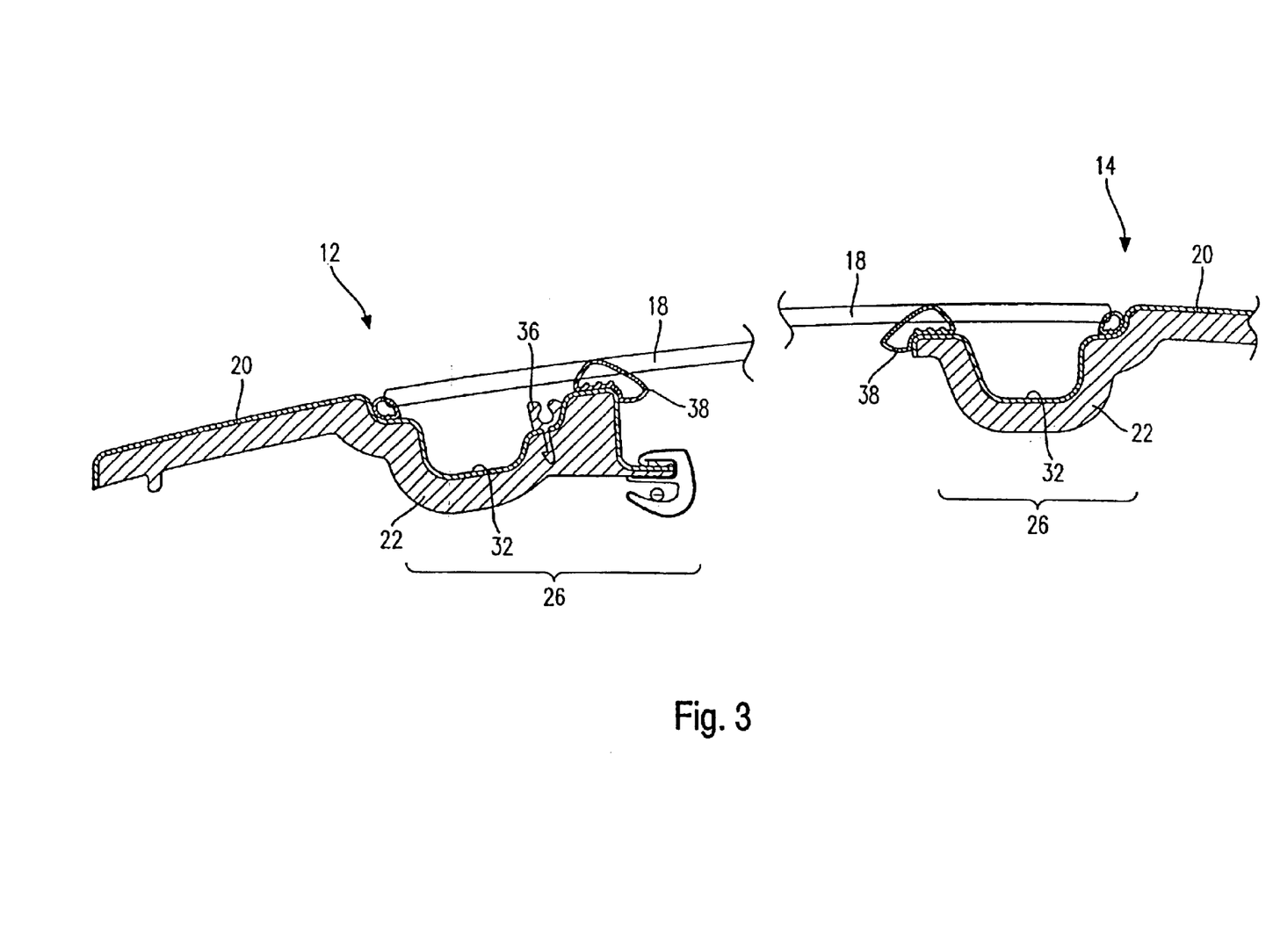
FIG. 3 shows a section along plane III—III of the roof module and sliding roof cover of FIG. 1.
Figure 4:
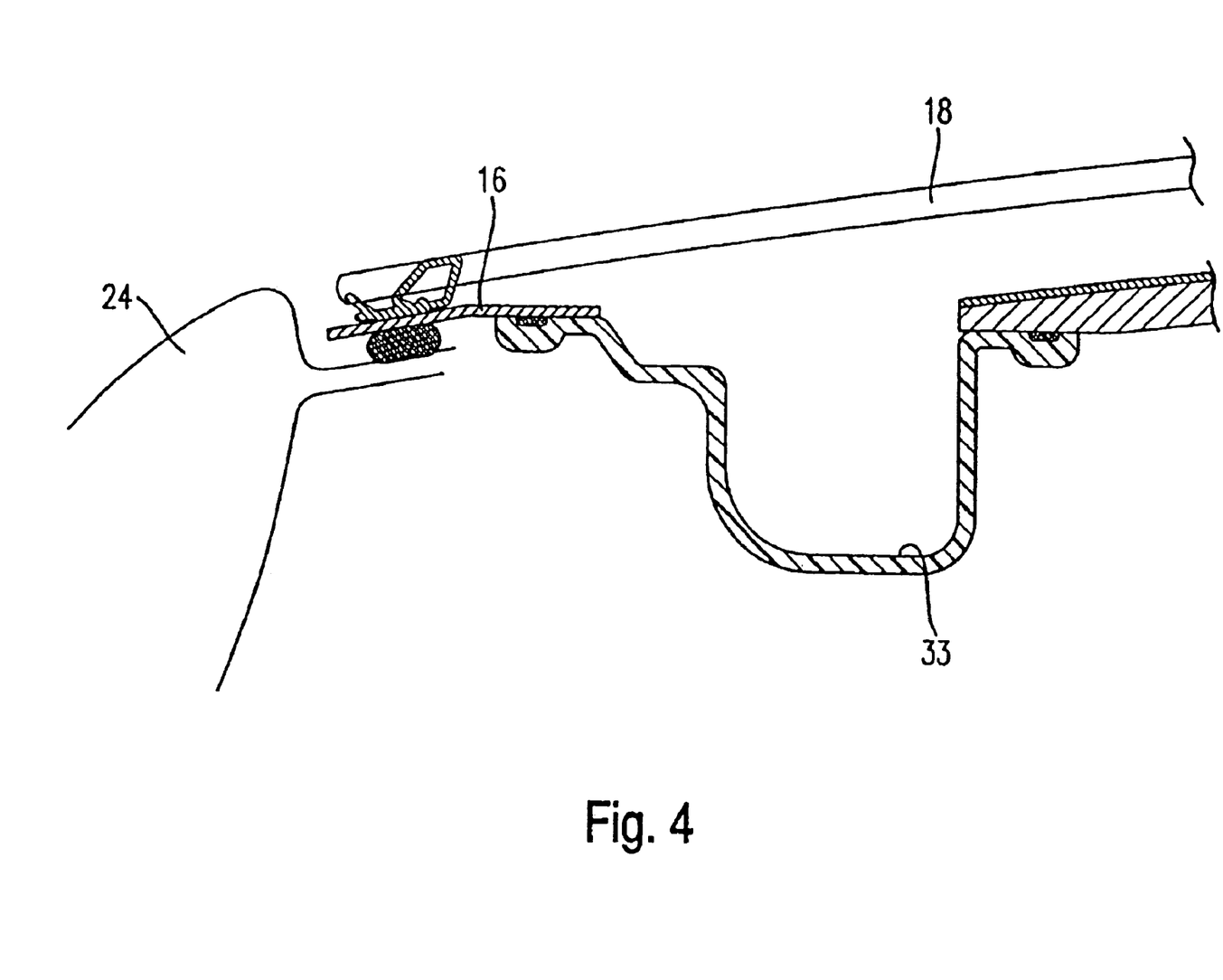
FIG. 4 shows a section along plane IV—IV of the roof module and sliding roof cover of FIG. 1.
Figure 7:
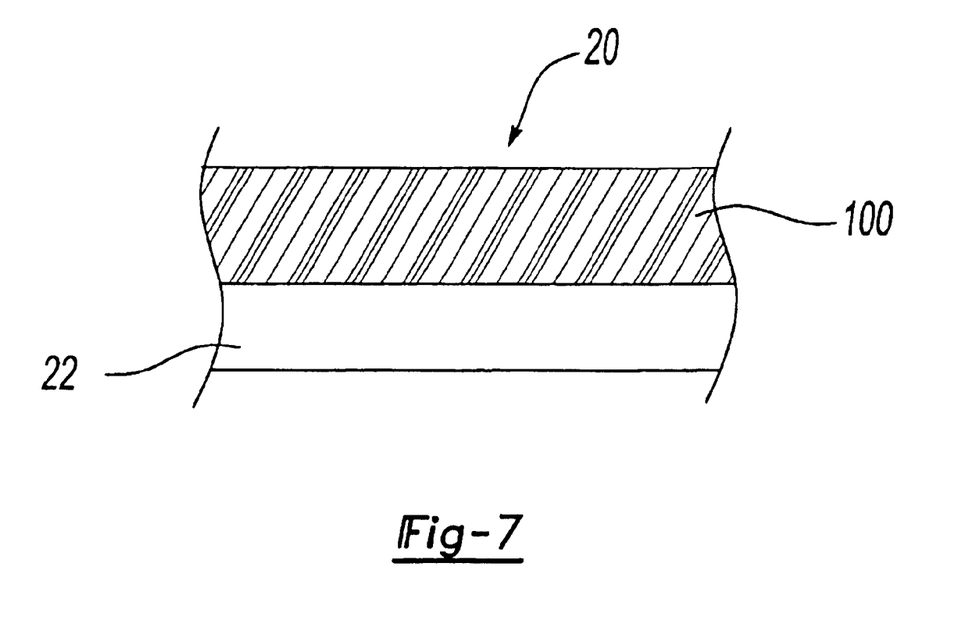
FIG. 7 shows one type of material for outer skin of the roof module.

The roof module has an outer skin 20, which may comprise a synthetic material 100 (see FIG. 7) or sheet metal as shown in FIG. 3. In either case, and as shown in FIG. 3, the back side of the outer skin 20 is partially lined with a foamed reinforcement layer 22 in a suitable fashion. As shown in FIG. 4, the roof module is placed on and connected to a car body of a motor vehicle. The strut 16 is bonded to a vehicle roof strut 24 as indicated.

Figure 2:
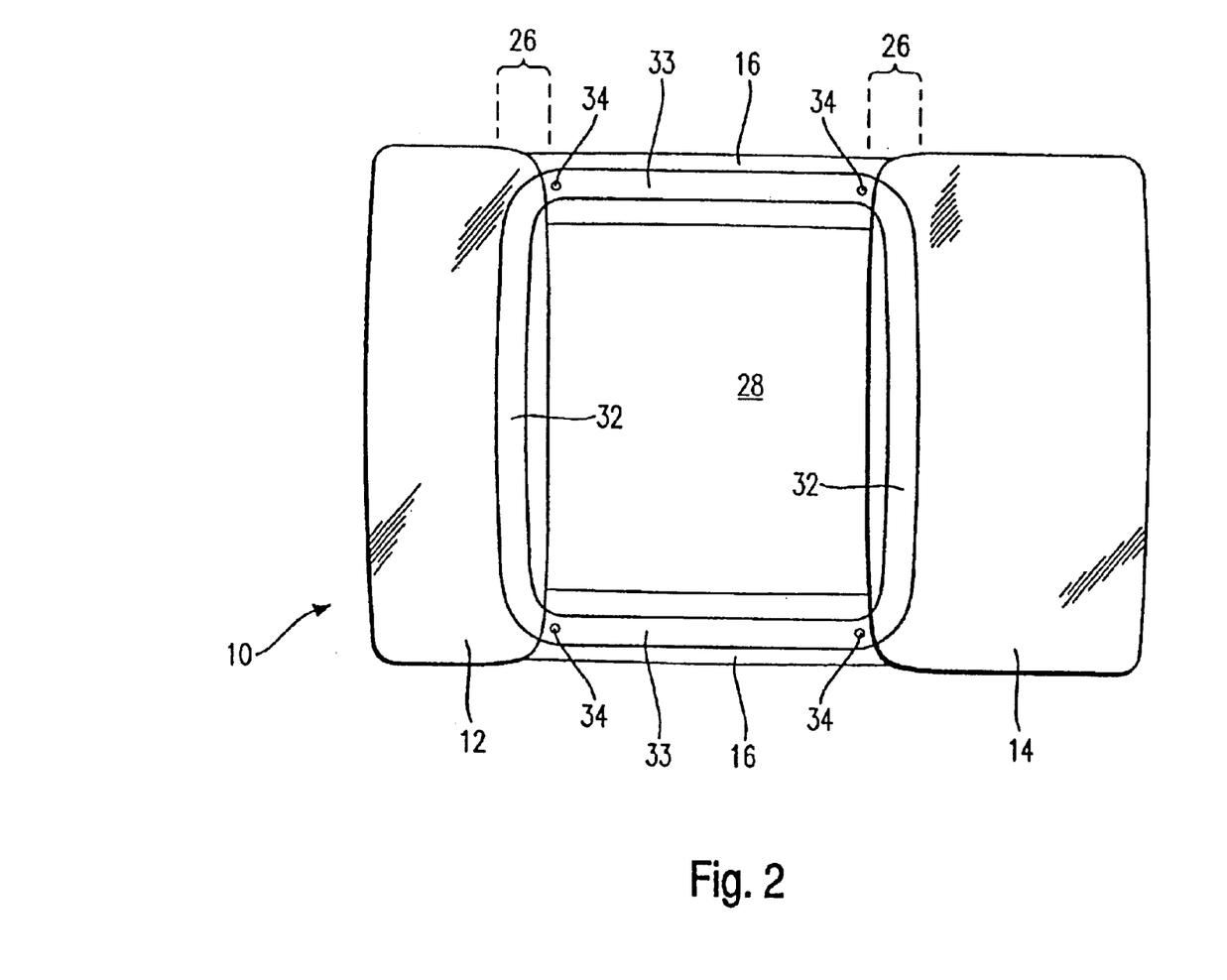
FIG. 2 is a top view of the roof module of FIG. 1 without the sliding roof cover.

In FIGS. 2 and 3, the two module parts 12, 14 each have a rim portion 26 that guides the module part towards the opening 28 for cover 18. In the rim portion 26, the outer skin 20 is deformed, for instance by deep-drawing, in such a manner that one water groove 32 is formed in each of the module parts 12, 14. In the region or the lateral outer rims of the module parts 12, 14, the water grooves 32 are configured with a curvature towards the opening 28, so that they continue into a water channel 33, which is provided on the struts 16 (see FIG. 4). The water channel 33 is a shaped part made of synthetic material and is bonded to strut 16. A suitable sealing compound is used at the transition to the module pans 12, 14 and to the water groove 32. Discharge openings 34 (see FIG. 2) in water channel 33 drain any water that has collected.

As shown in FIG. 3, a mounting part 36 at rim portion 26 of front module part 12 and adjacent to water groove 32 as well as below the cover 18. Mounting part 36, receive a moveable wind deflector. In the embodiment illustrated here, mounting part 36 is fastened through the outer skin 20 with an anchoring protrusion and is embedded in the foam of reinforcement layer 22.

Additionally, the roof module may be provided with suitable sealing member 38 and further components, for instance for guiding the cover, which are arranged in the water groove 32. Such components are not of importance for the comprehension of the invention and, therefore, will not be described in further detail here.

Figure 5:
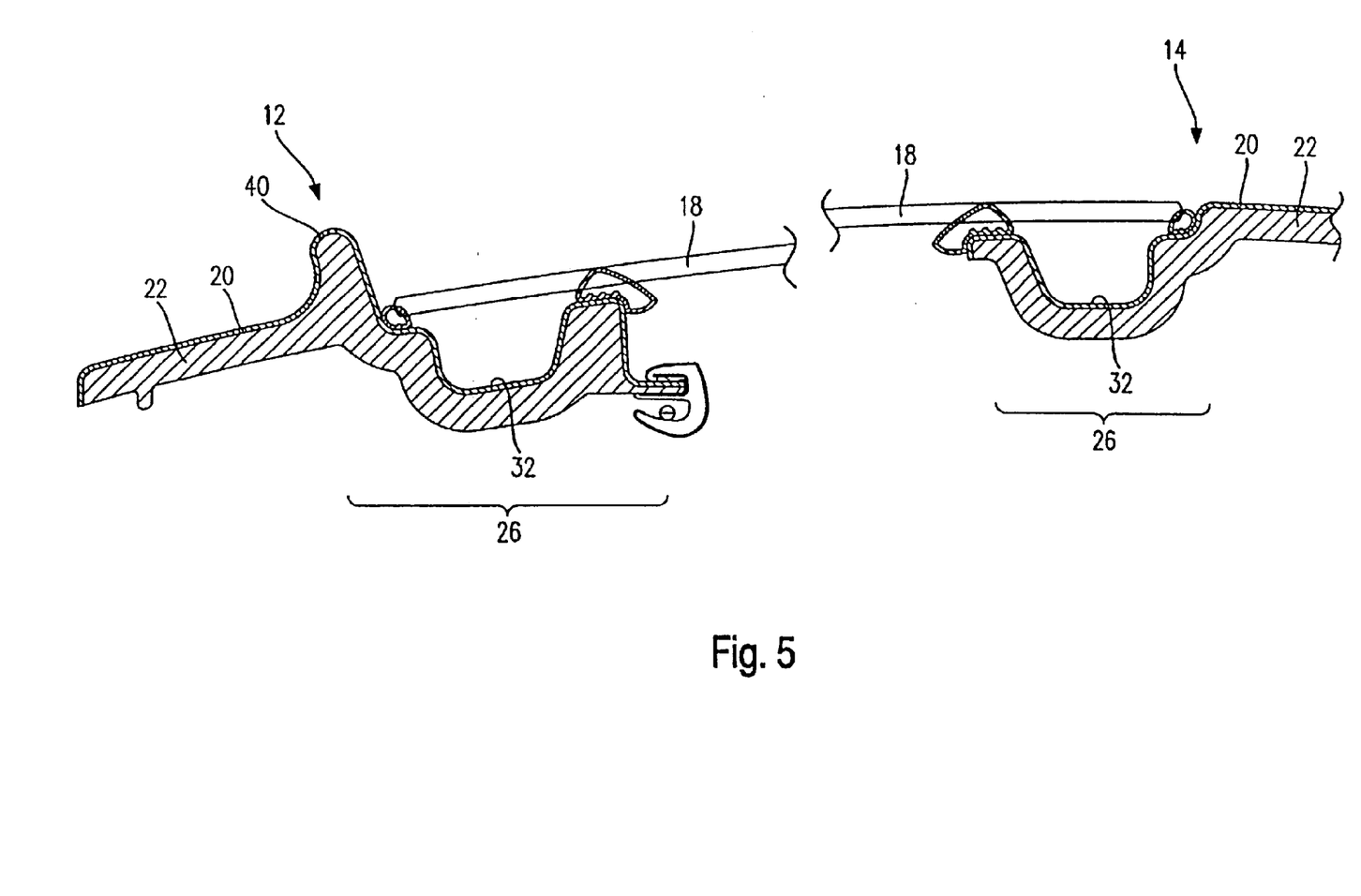
FIG. 5 shows another variation of a roof module in a view corresponding to that of FIG. 3.

FIG. 5 shows a variation that differs from the FIGS. 1 to 4 embodiment. inasmuch as A spoiler 40 is provided on front module part 12 in front of the water groove 32. This spoiler 40 is formed in one piece with the module part 12. To this end, the outer skin 20 is formed in a suitable fashion, for example by deep-drawing, and subsequently is provided with a foam backing layer. Because spoiler 40 is formed in one piece with roof module 10, the number of parts is further reduced.

Figure 6:
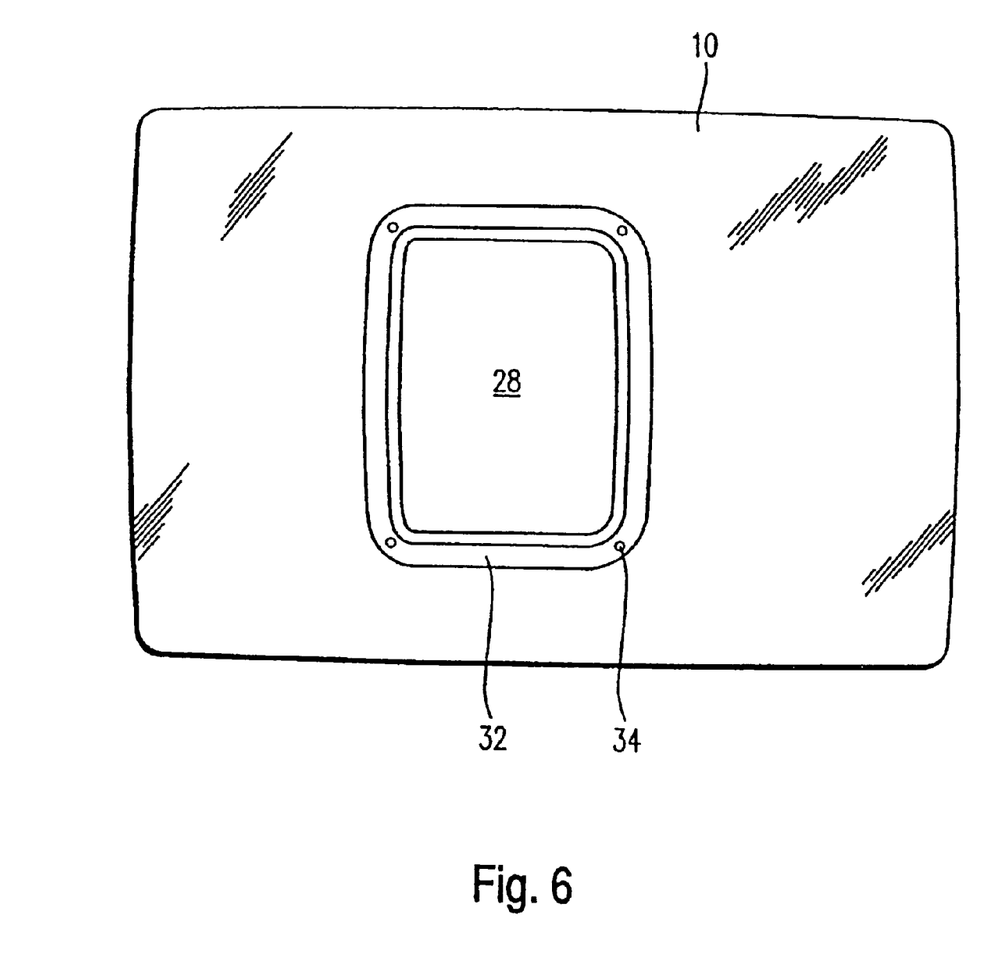
FIG. 6 is a top view of a roof module according to another variation without the sliding roof cover.

In FIG. 6, there is shown a roof module 10 according to another variation in which opening 28 is not formed between two module parts connected to each other by struts. Instead, opening 28 is provided directly in the roof module 10. In this arrangement, water groove 32 is formed so as to surround and be in one piece with the roof module. The cross-section of this water groove is similar to the cross-section of the water groove shown in FIG. 3. The discharge openings 34 for the water that has collected in water groove 32 are provided directly in the water groove 32. Preferably, connection pieces are embedded at those places under the outer skin in the foam of the lining where the discharge openings are provided. Drain tubes may be attached to these connection pieces.

Although preferred embodiments have been disclosed, a worker in the art would recognize that modifications would come within the scope of this invention. Thus, the following claims should be studied to determine the true scope and content of the invention.

What is claimed is:

1. A roof module for a motor vehicle, comprising:
   a roof module having an outer roof skin forming an exterior surface of a vehicle roof;
   a reinforcement layer under said outer roof skin;
   an opening for a moving roof cover formed in said outer roof skin; and
   a water groove formed in said outer roof skin adjacent said opening, the water groove being supported by the reinforcement layer along its cross-sectional extent.

2. The roof module according to claim 1, wherein said outer roof skin is made of deep-drawn metal.

3. The roof module according to claim 1, wherein said outer roof skin is made of a formed synthetic material.

4. The roof module according to claim 1, wherein said reinforcement layer comprise a foamed layer.

5. The roof assembly module to claim 1, wherein said roof module comprises several module parts, at least one of which being provided with said water groove.

6. The roof assembly module to claim 1, wherein said module parts are connected to each other by at least one strut and wherein provided on said strut is a water channel which is connected to said water groove.

7. The roof module according to claim 1, wherein said water groove entirely surrounds said opening.

8. The roof module according to claim 1, wherein said roof module has a spoiler that is adjacent to said water groove and that is formed in one piece with said roof module.

9. The roof module according to claim 1 wherein said water groove and said roof module form a single piece.

10. The roof module according to claim 1 including at least one discharge opening for discharging water in communication with said water groove.

11. The roof module according to claim 10 wherein said at least one discharge opening is located on said water groove.

12. The roof module according to claim 10 wherein said at least one discharge opening is located on a water channel connected to said water groove.

13. The roof module of claim 1 wherein said reinforcement layer extends under said water groove to about said opening.

* * * * *

UNITED STATES PATENT AND TRADEMARK OFFICE
CERTIFICATE OF CORRECTION

PATENT NO.    : 6,851,744 B2
DATED         : February 8, 2005
INVENTOR(S)   : Niebuhr et al.

It is certified that error appears in the above-identified patent and that said Letters Patent is hereby corrected as shown below:

Column 4,
Line 6, "claim 1" should read as -- claim 5 --.

Signed and Sealed this

Third Day of May, 2005

JON W. DUDAS
*Director of the United States Patent and Trademark Office*